March 26, 1946.　　A. ROBERTSON　　2,397,291
WIRE SUPPORTING CLIP
Filed May 22, 1943
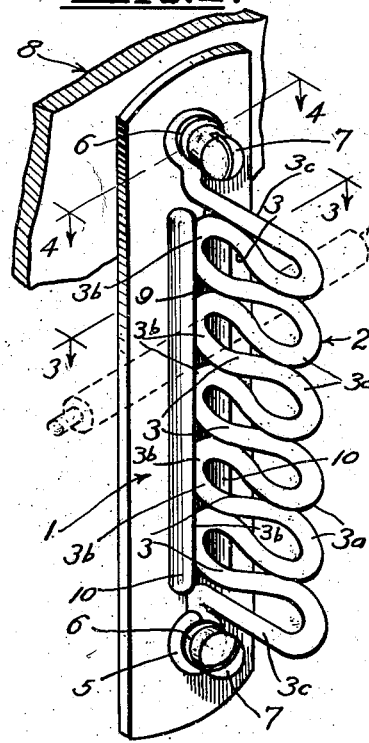
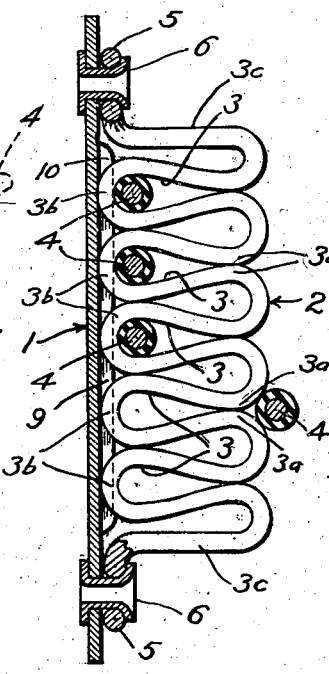
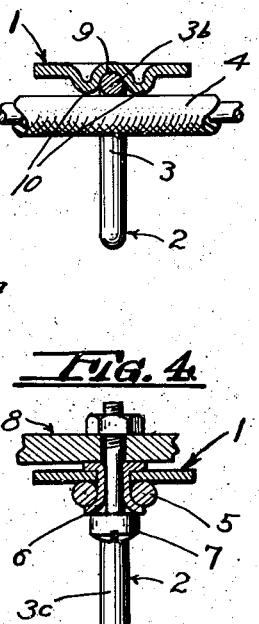
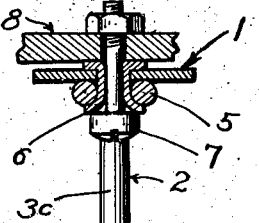
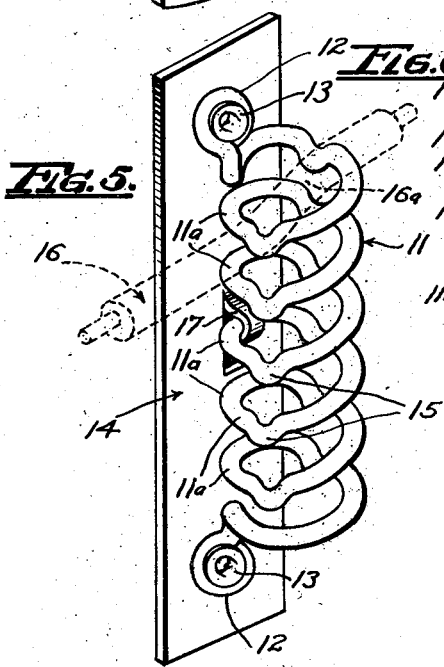
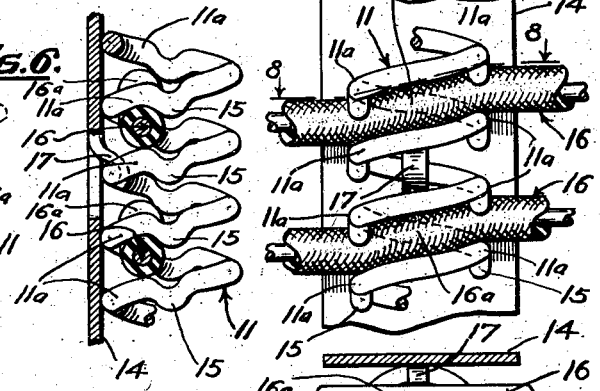
Inventor
ARCHIBALD ROBERTSON
By R. S. Berry
Attorney Patented Mar. 26, 1946

2,397,291

UNITED STATES PATENT OFFICE 2,397,291

WIRE SUPPORTING CLIP

Archibald Robertson, Balboa Island, Calif., assignor to Adel Precision Products Corp., a corporation of California Application May 22, 1943, Serial No. 488,303

5 Claims. (Cl. 248—68)

This invention relates to clips for supporting wires and the like in aircraft.

An object of this invention is to provide a wire supporting clip which is light as to weight, simple and inexpensive as to construction and designed so that a plurality of electrical wires or like members may be quickly and easily mounted therein in a compact group either before or after the mounting of the clip on a supporting structural part of the aircraft, with the wires securely and independently removably held in somewhat yieldable and vibration absorbing seats without requiring the use of fastening elements for said seats.

Another object of my invention is to provide a wire supporting clip of the character described which primarily includes a single spring wire element convolved or coiled to form a plurality of connected wire retaining loops arranged so that they will yield in a particular manner to permit of the insertion of the wires therein and then snap into position holding the wires in alignment with one another in a compact group.

Another object of my invention is to provide a wire clip of the character described in which the convolved spring wire element forming the series of wire gripping and holding portions is mounted on a base plate which lends a certain rigidity thereto, permits of the movement of said portions sufficient to open them for reception of the wires, and affords a secure mounting of the clip upon a structural part of the aircraft.

A further object of my invention is to provide a clip of the character described in which the group of wires supported thereby are independently held in a connected series of wire embracing portions thereby not only assuring a secure holding of each wire but making for an easy replacement of one or more wires without necessitating detachment of the clip or disturbing the other wires of the group.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a wire clip embodying my invention as installed;

Fig. 2 is a vertical sectional view of the clip as shown in Fig. 1;

Fig. 3 is a cross sectional view taken on the line 3—3 of Fig. 1;

Fig. 4 is a cross sectional view taken on the line 4—4 of Fig. 1;

Fig. 5 is a perspective view of a modified form of this invention;

Fig. 6 is a fragmentary side elevation of the device shown in Fig. 5 showing the manner of hooking it to the base plate;

Fig. 7 is a fragmentary front elevation of the form of the invention shown in Figs. 5 and 6;

Fig. 8 is a cross sectional view taken on the line 8—8 of Fig. 7.

Referring to the drawing more specifically, and particularly to Figs. 1 to 4 inclusive, it is seen that one form of my invention includes a base plate 1 and a spring wire member 2 supported thereon and convolved to form a series of superimposed loops 3 certain of which are adapted to receive the wires 4 to be supported thereby.

As here provided the ends of the member 2 are bent to form arm portions 3c and end curls which form eyes 5 which latter are secured by hollow rivets 6 to end portions of the base plate 1. Fastenings 7 are inserted through these rivets to secure the device to a supporting structural part 8 of the aircraft as shown in Figs. 1 and 2.

The member 2 as shown in Figs. 1 and 2 is sinuously convolved so that alternate loops 3 have abutting end portions 3a disposed on one side of the group of superimposed loops, with said end portions subject to being laterally displaced in order to open said loops whereby the wires 4 may be snapped sidewise into place therein following which said end portions will spring back to position closing the loops and yieldably clamping and holding the wires therein.

The inner ends or closed ends 3b of the wire embracing loops engage in a groove 9 formed between longitudinal ribs 10 on the base plate 1 whereby said inner ends are held in a line and against relative lateral movement. This, together with the fact that the loops abut one another in an aligned row, affords desired stiffening for the entire group of loops but does not prevent relative lateral displacement of the end portions 3a as necessary to open the loops for snapping the wires therein nor prevent a yielding action of the loops longitudinally of the group thereof.

It is seen that the loops 3 afford somewhat yieldable and vibration-absorbing seats for the wires due in part to the spacing of the arm portions 3c from the end loops of the group thereof as shown in Figs. 1 and 2, and the fact that the loops are subject to a yielding action longitudinally of the group thereof also a relative lateral movement at the outer ends 3a thereof.

It should be noted that the clip hereof may be effectively employed in sub-assembly operations in which the wires are placed in the loops before the clip is mounted in place on the aircraft.

It is now apparent that a clip constructed as here shown will support a group of wires in an aligned row and in small compass without the use of separate fastening elements to hold the wire embracing loops closed as has been the practice heretofore and that the device is comparatively light as to weight, simple as to construction and consists of but few parts, and may be quickly and easily mounted in place. The device also makes easy the replacement of one or more wires inasmuch as the wires are independently clamped by the respective loops and are subject to individual insertion and removal without disturbing the remainder of the group or requiring the loosening or removal of the fastening elements. The open ends 3a of the wire embracing loops 3 define V-shaped mouths affording the ready placement of the wires in position to be inserted in the loops.

Referring to Figs. 5 to 8 it is seen that a modified form of my invention consists in a helically coiled spring wire member 11 having eyes 12 at its ends secured by hollow rivets 13 to a base plate 14 corresponding to the plate 1.

The convolutions of this helically coiled member 11 form wire embracing portions or loops 11a and each convolution is furnished with short arcuate bends on opposite sides to form a pair of downwardly projecting lugs 15 which are adapted to engage and hold the wires 16 when the latter are placed between the spaced convolutions as shown in Figs. 5 to 8 inclusive.

In the use of this form of my invention the wires 16 are forced sidewise between the convolutions of the member 11 past the lugs 15. The convolutions are yieldingly forced apart by this action so that when the wires are moved past said lugs into a predetermined position the convolutions will yieldingly grip the wires. It is noted that the portions 16a of the wires embraced by said convolutions are angularly disposed compared to these portions of the wires which extend on opposite sides of the member 11, thereby more securely holding the wires against any longitudinal movement relative to said convolutions and also gripping the wires at spaced points to insure an effective holding thereof. This form of the invention provides yieldable and vibration-absorbing seats for the wires with each wire independently insertable, removable and held to the same advantage as in the first form of my invention.

In order to more firmly secure the coiled member 11 in place and lend certain desired rigidity thereto a hook 17 is struck out from the base plate 14 and hooked around one of the intermediate convolutions of said member as shown in Figs. 5 and 6.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a supporting clip for wires, a spring wire member bent to form a series of connected wire embracing portions arranged to be sprung apart to permit of the insertion and removal of wires therein and to spring back into position clamping and holding said wires in an aligned group therein following the insertion of the wire into predetermined positions therein, means for securing said member to a support including a base plate; and means for securing the ends of said wire member to said base plate, said base plate having a groove longitudinally engaging said wire member between its ends and holding it against lateral movement relative to the base plate.

2. In a supporting clip for wires, a spring wire member sinuously convolved to form a series of connected superimposed wire-embracing loops each having substantially abutting opposed outer end portions subject to relative lateral deflection to open the loops for insertion therein of wires to be supported thereby, and means for securing said member to a support so that the inner end portions of said loops will be directed toward said support, said wire member having curled end portions to receive said securing means.

3. In a supporting clip for wires, a spring wire member helically coiled so that wires may be inserted between convolutions thereof and yieldingly gripped thereby and independently removed therefrom, means for securing the ends of said member to a support, and downwardly projecting lugs on opposed convolutions for yieldingly holding wires between the convolutions, said lugs consisting of short arcuate bends in said wire convolutions.

4. In a supporting clip for wires, a spring wire member bent to form a series of connected wire embracing portions arranged to be sprung apart to permit of the insertion and removal of wires therein and to spring back into position clamping and holding said wires in an aligned group therein following the insertion of the wire into predetermined positions therein, means for securing said member to a support including a base plate; and means for securing the ends of said wire member to said base plate; said base plate having a groove longitudinally engaging said wire member between its ends and holding it against lateral movement relative to the base plate, the width and depth of said groove being each substantially the same as the diameter of said wire.

5. In a supporting clip for wires, a spring wire member bent to form a series of connected wire embracing portions arranged to be sprung apart to permit of the insertion and removal of wires therein and to spring back into position clamping and holding said wires in an aligned group therein following the insertion of the wire into predetermined positions therein, means for securing said member to a support including a base plate; and means for securing the ends of said wire member to said base plate; said plate having, projecting from its face, a pair of parallel ribs between which successive looped portions of said wire are fitted, said ribs projecting outwardly from said base plate a distance substantially equal to the diameter of said wire, said ribs being separated from each other by a space substantially equal to the diameter of said wire.

ARCHIBALD ROBERTSON.